MOSAIC PRINCIPLE

INVENTOR.
PAUL A. NOXON
BY Herbert L. Davis
ATTORNEY

Jan. 25, 1966 P. A. NOXON 3,230,819
OPTICAL DISPLAY MEANS FOR AN ALL WEATHER
LANDING SYSTEM OF AN AIRCRAFT
Filed July 25, 1962 5 Sheets-Sheet 3

INVENTOR.
PAUL A. NOXON
BY *Herbert L. Davis*
ATTORNEY

Jan. 25, 1966 P. A. NOXON 3,230,819
OPTICAL DISPLAY MEANS FOR AN ALL WEATHER
LANDING SYSTEM OF AN AIRCRAFT
Filed July 25, 1962 5 Sheets-Sheet 4

INVENTOR.
PAUL A. NOXON
BY *Herbert L. Davis*
ATTORNEY

INVENTOR.
PAUL A. NOXON

ATTORNEY

United States Patent Office 3,230,819
Patented Jan. 25, 1966

3,230,819
OPTICAL DISPLAY MEANS FOR AN ALL WEATHER LANDING SYSTEM OF AN AIRCRAFT
Paul A. Noxon, Tenafly, N.J., assignor to The Bendix Corporation, Teterboro, N.J., a corporation of Delaware
Filed July 25, 1962, Ser. No. 212,377
2 Claims. (Cl. 88—1)

The invention relates to an optical display means for an all weather landing system of an aircraft and more particularly to improvements in a display means for a vehicle approach system such as disclosed and claimed in U.S. application Serial No. 137,708, now abandoned, filed August 30, 1961, by Julius Schiffman for an all weather approach system, and U.S. application Serial No. 233,969, filed October 29, 1962, as a continuation thereof, which application has been assigned to The Bendix Corporation, assignee of the present invention.

An object of the invention is to provide a novel means to supply to the pilot of an aircraft a display in a pictorial fashion of an image of substantial spacial identity to that of a physical array of beacons on the ground together with a view of real world information during conditions of low visibility.

Another object of the invention is to provide in such a novel display means full data by which landing of an aircraft may be effected or auxiliary data to that being actually used for landing to promote pilot confidence and to provide a basis for the exercise of judgment on the part of the pilot in monitoring an automatic pilot system.

Heretofore, means have been developed as described and claimed in the aforenoted U.S. application Serial No. 233,969 whereby there may be applied in a rectangular coordinate system, on the screen of a cathode ray tube, a spot representing the angular position of a radar beacon relative to the boresight of an aircraft, both vertically and horizontally. Since a number of these can be plotted simultaneously, there may be obtained, by outlining the runway with beacons, a picture of the runway on the cathode ray tube, as outlined by such beacons, which appear as lights on the screen. Means to effect this technique are disclosed and claimed in the aforesaid U.S. application Serial No. 233,969.

However, if the pilot attempts to use a small picture of this sort directly for landing an aircraft or as a geometrical data display for judging the performance of a landing system, the pilot may be confronted by the problem of scale. It is difficult for this reason for the pilot to instantly comprehend this spacial relationship to the runway in the way that he can do this if, in fact, he can see the ground, where things are seen substantially as infinity and at 1:1 scale.

Accordingly, it is an object of the invention to provide novel means whereby there may be displayed an image produced by the technique of the aforenoted U.S. application Serial No. 233,969 in such a way that the aforenoted difficulty may be almost entirely overcome.

Another object of the invention is to provide a novel structure in which a partially reflecting mirror is so placed in relation to the pilot that he may apprehend real world information by looking through it, while information superimposed thereon is reflected from it.

Another object of the invention is to provide a reflecting dichroic film which has the property of being a very efficient reflector at a narrow frequency band, and in which there may be employed in cooperation therewith a filter or other means to achieve a color of the image to be reflected corresponding to the efficient point of the mirror, and by which means spurious reflections from the back surface of the mirror and the windscreen itself are greatly minimized, and in which the characteristic color provided by the filter may tend to eliminate confusion between the real world picture and that being furnised by the cathode ray tube of the vehicle approach system, as described and claimed in the aforenoted U.S. application Serial No. 233,969.

Another object of the invention is to provide an arrangement in which there is interposed between the mirror and the cathode ray tube of the aforenoted vehicle approach system, a lens or lens system such that there may be provided parallel exit rays whereby the pilot's eye may see the picture on the cathode ray tube as though it were in infinity focus and in which an image may be so magnified as to provide a 1:1 relationship with the image size and the real world, the vehicle approach system described in the aforenoted U.S. application Serial No. 233,969 being so organized as to produce an image size on the surface of the cathode ray tube such that the aforenoted objective may be obtained.

Another object of the invention is to provide the aforenoted pictorial display means and the very desirable property that while the angle subtended by the image on the tube if viewed directly would vary inversely as the distance from the pilot's eye, the magnification factor may be such as to vary in an inverse manner and exactly cancel the apparent change in image size, so that movement of the pilot's head longitudinally does not change the size of the image he sees, since he is viewing parallel rays, and the systems optical and electrical parts refer to the same datum (the aircraft) movement of his head laterally produces no parallax between the observed image and any real world object he can perceive.

Another object of the invention is to provied a novel optical display means in which there may be, in fact, produced an image which may appear to the pilot as an array of landing lights actually on the ground, which if the system be without alignment and linearity errors, these lights will appear to be where the beacons used in the vehicle approach system are, in fact, located.

Another object of the invention is to provide in such a system a novel arrangement of dichroic mirrors in a pair of goggles which the pilot may wear toegther with a pair of 1:1 telescopes through which there may be viewed a collimated display projector directly behind the pilot's head conveniently arranged so as not to obstruct the instrument panel, windscreen and forward part of the cockpit of the aircraft.

Another object of the invention is to provide in such a system a novel arrangement of a dichroic parabolic combining mirror positioned adjacent the windshield of the aircraft and having image producing capabilities through which the pilot may view the real world by transmitted rays and combined with the reflected virtual image (at infinity) of an instrument or display projector positioned in the aircraft beside the pilot's head.

These and other objects and features of the invention are pointed out in the following description in terms of the embodiments thereof which are shown in the accompanying drawings. It is to be understood, however, that the drawings are for the purpose of illustration only and are not a definition of the limits of the invention, reference being had to the appended claims for this purpose.

Figure 6:
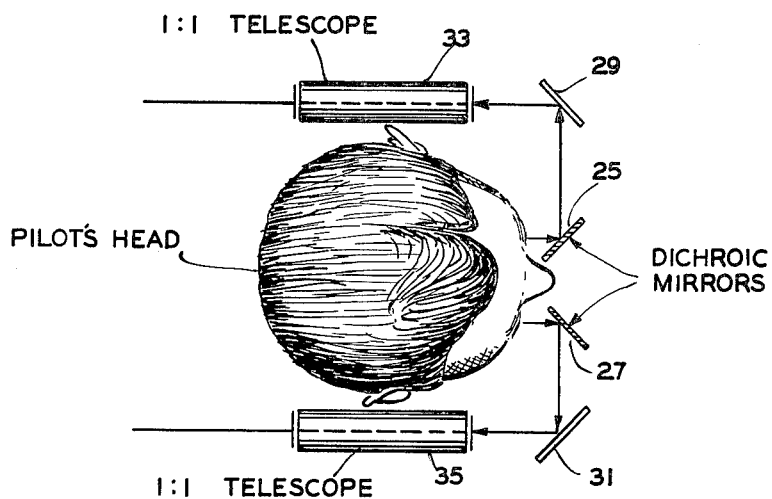

FIGURE 6 illustrates schematically a second form of the invention including a pair of goggles which the pilot may wear and in which there may be applied a dichroic mirror effective to provide two reflections so that the exit ray leaving the optical system worn by the pilot may be parallel to the entrance ray so that the effects of a portion of the angular motion of the pilot's head may be cancelled out.

Figure 7:
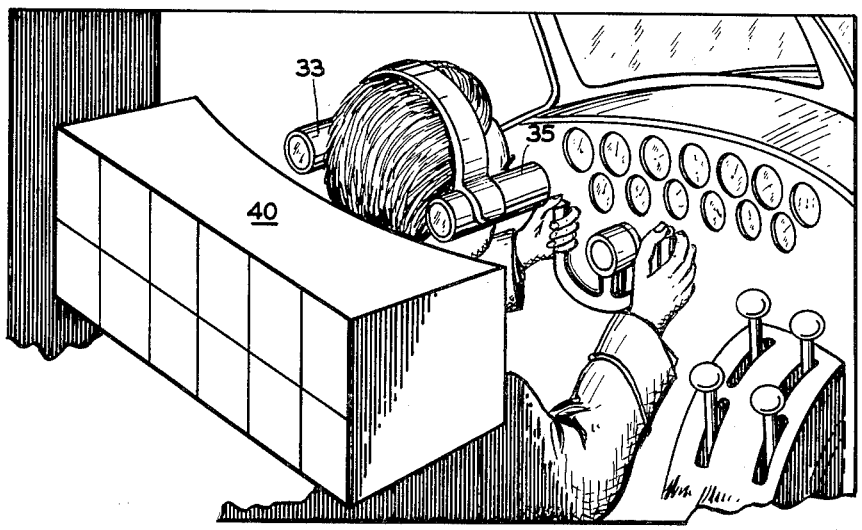

FIGURE 7 shows the system of FIGURE 6 arranged in an aircraft in which a cathode ray tube image is positioned directly behind the pilot's head in an available space in the aircraft so that the instrument panel, windscreen, and the whole forward part of the cockpit remains completely unobstructed.

Figure 8:
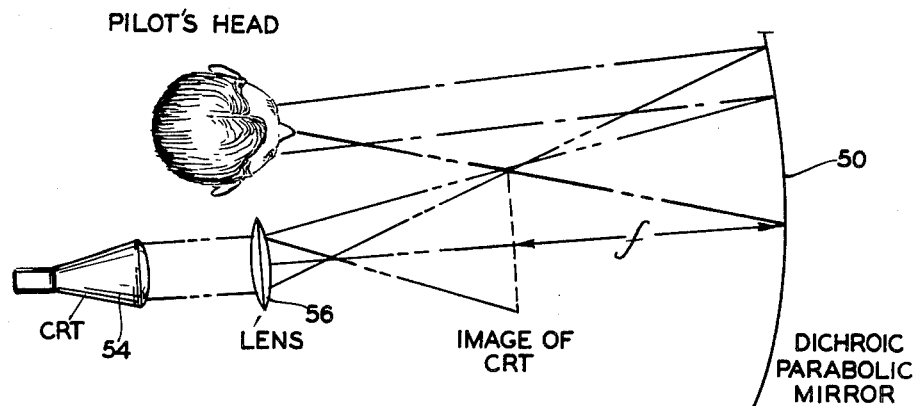

FIGURE 8 illustrates schematically a third form of the invention in which there is provided a combining mirror having image producing capabilities (e.g. a thin partially silvered or dichroic parabolic mirror) through which the pilot may view the real world by transmitted rays and with which there may be combined with the reflected virtual image (at infinity) from a projector positioned physically beside the pilot's head.

Figure 9:
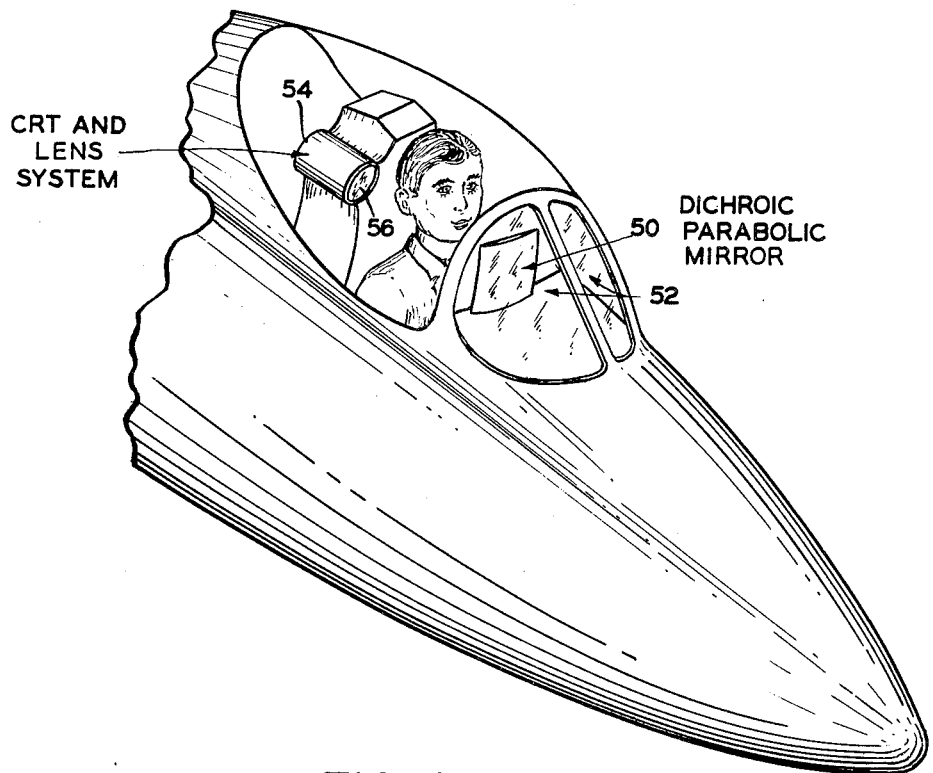

FIGURE 9 shows the system of FIGURE 8 arranged in an aircraft with the dichroic parabolic mirror positioned adjacent the windshield and with the cathode ray tube and the lens image projector positioned immediately beside the pilot's head and further shows a pictorial representation of the pilot of the aircraft in the flight thereof.

In the vehicle approach system with which the novel optical display means of the present invention is adapted for use, a display of real world information is provided in which the landing area or runway for an aircraft is to be outlined by microwave beacons by a technique and in a manner similar to the array of beacons described in the aforenoted U.S. application Serial No. 233,969.

These beacons may transmit pulses on the order of a microsecond in length, at a rate of, perhaps four hundred a second. They fire at random, and no synchronization or sequencing is required. Exept for the requirement of avoiding reflections from terrestrial objects, there is also no particular requirement for directivity of the radiation pattern. In the aircraft there may be provided equipment which measure, passively and without appreciable time lag, the direction, relative to aircraft boresight, both laterally and vertically, of each pulse as it arrives. These pulses are translated into horizontal and vertical distances, and for each pulse is plotted a bright spot on the screen of a cathode ray tube in its appropriate coordinate position as shown in the aforenoted U.S. application Serial No. 233,969. A summation of all of these spots results in a pictorial presentation of the runway as though outlined by lights at night.

In order to make maximum use of the pictures thus generated on the screen of the cathode ray tube, it is necessary that the same be projected into the pilot's line of vision.

Figure 1:
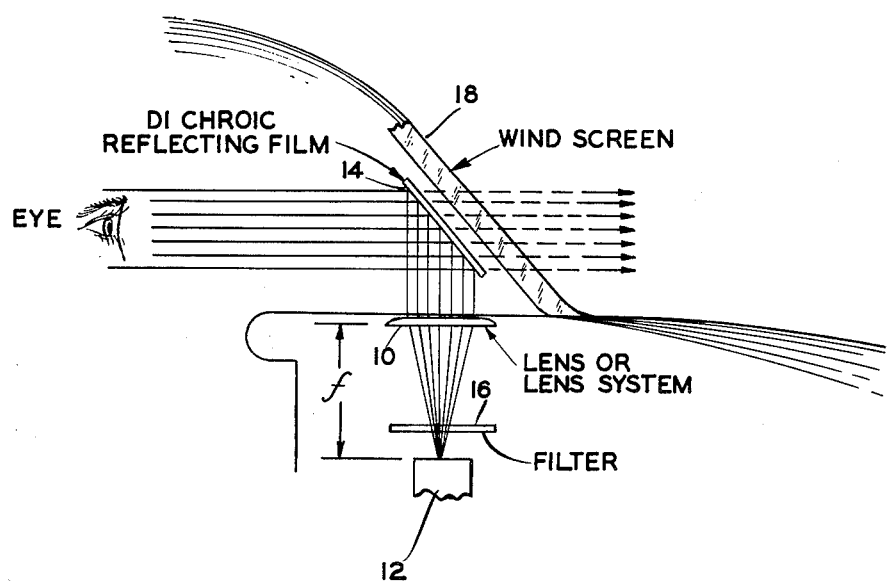
FIGURE 1 is a schematic view of one form of the invention illustrating the operative relationship between the cathode ray tube of the vehicle approach system and the lens and dichroic reflecting film viewed by the eye of the pilot.

Referring now to FIGURE 1, there is shown schematically how the foregoing may be accomplished in an arrangement in which there is provided a lens or lens system indicated by the numeral 10 positioned at a distance equal to its focal ($f$) length from the screen of a cathode ray tube indicated by the numeral 12. The lens system 10 must, of course, be of large enough aperture to cover the required angle of view.

Each point on the surface of the tube 12 (e.g., that is, a spot) will be imaged as a system of parallel lines through the operation of the lens system 10. These parallel image lines may then be projected into the pilot's vision by a partially reflecting mirror indicated by the numeral 14, and which may be a dichroic thereby allowing the pilot to view a virtual image of a picture at infinity.

Now it is a property of an optical system such as this that the exit rays are parallel, and the pilot's eye will perceive the picture on the cathode ray tube 12 as though it were at infinity focus. Such a system also unavoidably magnifies the image, and since it is desirable to have a 1:1 relationship with image size and the real world the system may be organized to produce an image size on the screen of the cathode ray tube 12 such that this objective may be obtained.

Thus by proper calibration, this system may be so arranged that the image appears in real angular size. If in addition it is properly aligned, its relation to the runway will be correct, and the beacons, as imaged by the system, will appear as lights located on the edge of the runway and thus blendout and not interfere with the pilot's view of the real world, when contact is established.

While the element 14 may be a partially silvered mirror, there is preferably employed a dichroic reflecting film which has the property of being a very efficient reflector of a narrow frequency band of light and there may be employed in the system a filter indicated by the numeral 16 or other suitable means to achieve a distinctive color to the image reflected at a point corresponding to the exit point of the mirror 14.

By this means, spurious reflections in the back surface of the mirror 14 and in a windscreen 18 may be greatly minimized. A characteristic color of the reflected image as affected by the filter 16 may also tend to eliminate confusion between the real world picture and that being furnished by the cathode ray tube 12, as operated by the vehicle approach system of the aforenoted U.S. application Serial No. 233,969.

The optical display system illustrated in FIGURE 1 is so arranged that, while the angle subtended by the image on the tube 12 if viewed directly would vary inversely with the distance from the pilot's eye, the magnification factor varies in an inverse manner and exactly cancels the apparent change in image size so that movement of the pilot's head longitudinally does not change the size of the image he sees. Since the pilot is viewing parallel rays and the systems optical and electrical components refer to the same datum (the aircraft) movement of the pilot's head laterally produces no parallax between the observed image and any real world object he can perceive. There is then, in fact, produced an image which appears to the pilot as an array of landing lights actually on the ground and if the system be without alignment and linearity errors, these lights will appear to be where the beacons used in the system are in fact located.

The system of FIGURE 1 may include an optical system generally of a class such as has been in use for many years as part of a gunsight control. Such an optical system, as applied to a gunsight control, may be of somewhat simpler design since the required angle of view may be smaller and the operator may have to concentrate on only one display and may not be unduly disturbed by head motion. The requirements of the optical display means in the present invention, however, is applied to a landing system for an aircraft and gives rise to difficulties which are not encountered in such gunsight controls.

Figure 2:
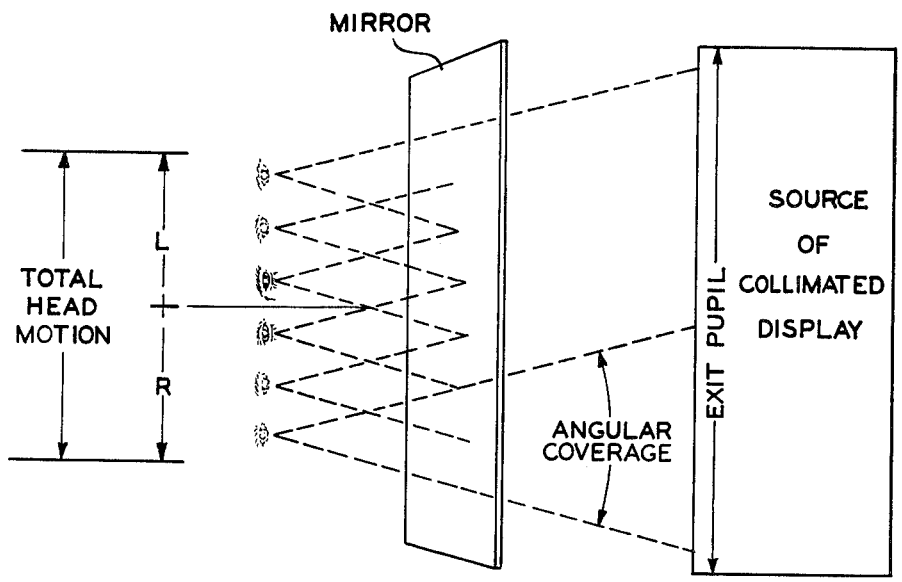
FIGURE 2 is a diagrammatic illustration showing that the angle of view required for a real size view of the aircraft runway must be at least a total of thirty degrees (30°) and that in order for the observer to encompass this angle there may be placed a mirror near the windshield large enough to encompass all of these possible paths of light.

Thus referring to the diagrammatic illustration of FIGURE 2, it has been discovered that the angle of view required for a real size view of the aircraft runway by the pilot must be at least a total of thiry degrees (30°) and an even wider angle of view would be desirable. Thus each eye of the observer must encompass this angle, since the pilot must be able to operate throttles, reach knobs, and other operative instruments of the aircraft, and must be allowed a reasonable tolerance for head motion, as indicated diagrammatically in FIGURE 2.

Thus in the system shown in FIGURE 1, the mirror 14 placed near the windshield 18 must be large enough to encompass all of these possible paths of light. Should the cathode ray tube projector 12 be placed at some distance from the mirror 14 as it desirably should be, the exit pupil required becomes truly enormous.

Several solutions to the problem are possible such as the use of a dichroic parabolic mirror, as shown in the form of the invention of FIGURES 8 and 9, in place of the plain dichroic mirror 14 of FIGURE 1. Moreover, dichroic mirrors in the pilot-worn goggles, in the form of the invention of FIGURES 6 and 7, may be utilized with the end in view of achieving an angle of view and freedom of head motion such as may be reasonably required. The optical systems set forth in the forms of the invention of FIGURES 1, 7, and 9 must, of course, image any point corresponding to a picture element on the cathode ray screen as a system of parallel rays. There is no requirement, however, that all of the rays representing a single picture element must pass through the same lens, or in fact, that they proceed from the same source.

Figure 3:
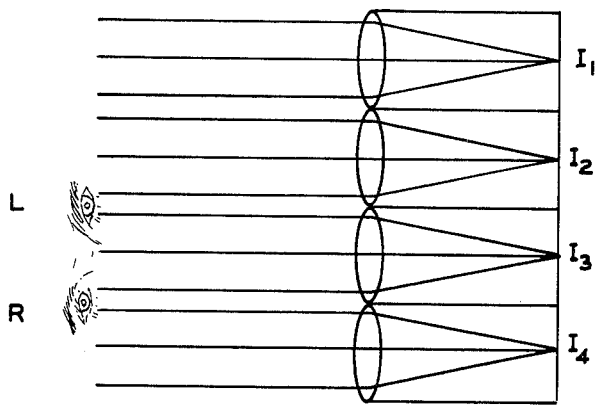
FIGURE 3 is a diagrammatic view which represents a series of identical optical systems placed as closely together as possible so that the display projected may be multiplexed into a corresponding number of images $I_1$, $I_2$, $I_3$, and $I_4$ being conceived as the same picture element, multiplexed into four different systems which may be termed the technique of the mosaic principle.

Thus, for example, as shown diagrammatically by FIGURE 3, the source of collimated display may represent a series of identical optical systems placed as closely together as possible. The display projected is multiplexed into a corresponding number of images $I_1$, $I_2$, $I_3$, and $I_4$ being conceived as the same picture element compressed into four different systems. If proper alignment is achieved, an eye of the viewer placed anywhere in the field may get the same impression. It makes no difference if both the viewers eyes see through one system, through two systems, or in fact, if the rays entering a single eye are obtained from two sources simultaneously as indicated.

Since there are not restrictions as to the number of such systems that may be stacked horizontally and vertically, there is no theoretical limit to the size of the exit pupil that may be achieved. This technique may be termed the mosaic principle.

Figure 4:
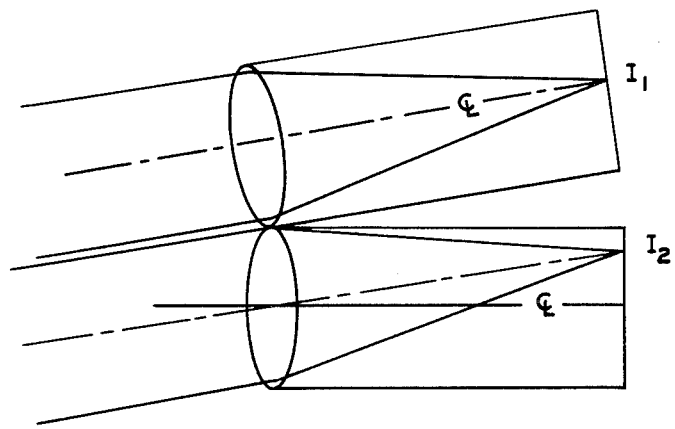
FIGURE 4 illustrates diagrammatically that the mosaic principle may be applied to the problem of increasing angular coverage as well as exit pupil by displacement of the picture elements by an amount called for by the angular displacement of the optical axis of the mosaic component.

Referring now to the drawing of FIGURE 4, there is shown diagrammatically therein that the mosaic principle may be applied to the problem of increasing angular coverage as well as enlarging the exit pupil. In the latter case, it is only necessary to displace the picture elements by an amount called for by the angular displacement of the optical axis of the mosaic component in order to properly register the relevant image with the others.

Figure 5:
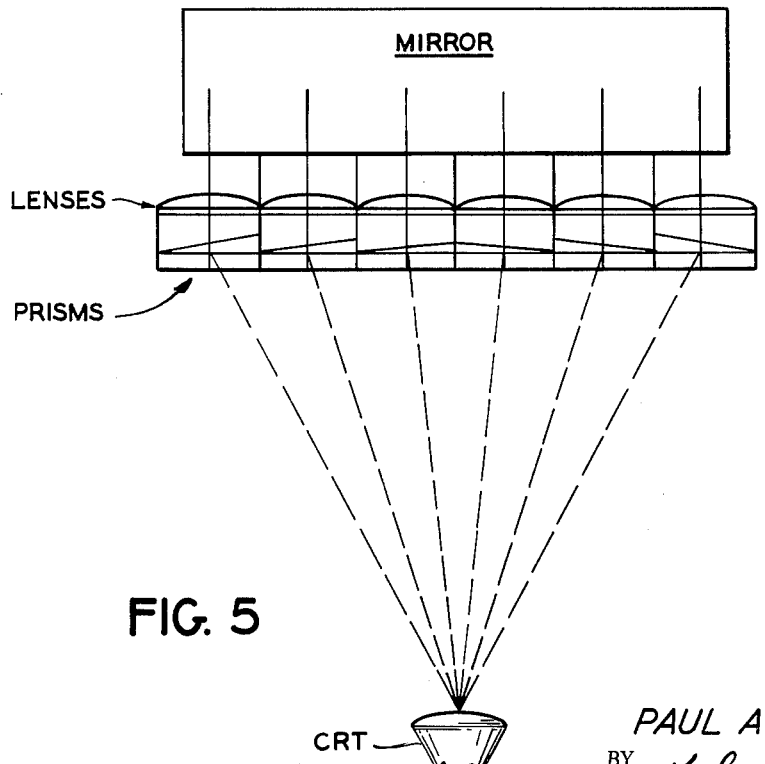
FIGURE 5 illustrates diagrammatically a method by which an image upon the cathode ray tube may be muliplexed optically through the provision of a series of lenses and prisms.

The image may be multiplexed in a number of ways. Thus, as is shown in FIGURE 5, this may be accomplished optically by the provision of a linear array or mosaic of lenses and prisms in which the focal length of each lens and the angle of refraction of each prism is arranged to provide parallel emergent rays throughout the whole mosaic from rays emanating from the cathode ray tube screen.

Through such means spherical aberration may be controlled, and in fact limited to that produced by each individual lens of the mosaic within the aperture. Since each lens will be relatively thin any resulting aberration would be small.

The image may also be multiplexed through use of fiber optics, or the desired result may be accomplished electrically either by multiplexing the image the required number of times on the screen of the large cathode ray tube or by employing a separate tube for each mosaic element.

While such a projector or source of collimated display may be used with almost any conceivable mirror location, it is a difficult problem to find a suitable place to mount the equipment for the coordinated display in the aircraft, particularly with reference to the windshield, since available space is always limited, especially in the region of the instrument panel.

Second form of the invention

With the foregoing problems in mind, the second form of invention, as illustrated by FIGURES 6 and 7, was conceived with the view of avoiding the space elements aforementioned. In the latter form of the invention, as illustrated by the form of the invention of FIGURE 6, there may be provided a pair of dichroic mirrors 25 and 27 which may be assembled in a pair of goggles to be worn by the pilot and arranged in a cooperative arrangement with mirrors 29 and 31 cooperating with a pair of 1:1 telescopes 33 and 35.

In such arrangement, light rays pass from a collimated display 40 and through the telescopes 33 and 35 so as to be reflected by the mirrors 29 and 31 and through the dichroic mirrors 25 and 27. The exit rays leave the system parallel to the entrance rays so that a portion of the angular motion of the pilot's head is cancelled out. The telescopes 33 and 35 so view the source of collimated display 40, as shown in FIGURE 7, as to effect the desired result at the dichroic mirrors 25 and 27. This provides a reasonably light compact unit, becoming a part of the pilot's helmet.

FIGURE 7 illustrates a cockpit arrangement of the system in the aircraft in which the projector or source of collimated display 40 is shown directly behind the pilot's head in a conveniently available space so that the instrument panel windshield and the whole part of the cockpit remains completely unobstructed. Since the viewing distance is reduced to a minimum by the foregoing arrangement, the projector 40 may be made smaller in size than any other practical location would require.

Third form of the invention

In the third form of the invention illustrated in the FIGURES 8 and 9, there is provided a dichroic parabolic mirror, indicated generally by the numeral 50, positioned adjacent the windshield 52 and having image producing capabilities (e.g. a thin partially silvered spherical element) through which the pilot may view the real world by transmitted rays and in which there is combined a reflected virtual image of the screen of the cathode ray tube 54 formed by the parabolic mirror 50 and suitable lens arrangement 56 cooperating as a collimating optical system. The lens arrangement 56 is located in the cabin of the aircraft in a position adjacent the pilot's head, as shown in FIGURE 9.

Heretofore, such techniques have been required to meet the requirements to cover a relatively narrow field of view of, for example, ten degrees (10°). However, in the provision of such a device for an optical display means for the present landing system a much greater angle (on the order of forty degrees (40°)) is required.

In order to affect the foregoing, the size of the object (such as the cathode ray tube) required to cover the given angle of view may be determined from the following equation:

$S$ = radius of screen
$S = 2f \tan d$ where $f$ = focal length of optic
$d$ = max. angle off the ₵ or center line of the optical system (½ the angle of view)

From this equation, it may be seen that if such a dichroic parabolic mirror 50 is placed near the windscreen 52, as shown in FIGURE 9, for example, thirty inches (30") from the cathode ray tube 54 and lens arrangement 56, in order to affect the required forty degree (40°) angle of view, then the following would be required:

$$S = 2 \times 30 \times .364 = 21.8''$$

diameter (which is impracticable).

The third form of the invention illustrated in FIGURES 8 and 9 will effectively overcome this difficulty in that in such arrangement, the cathode ray tube 54 and suitable lens arrangement 56 is placed adjacent to the pilot's head with the lens 56 and eyes of the pilot being each at substantially the same distance from the dichroic parabolic mirror 50.

If the mirror 50 has a focal length of half the distance, say 15 inches, it is an optical fact, then, that with proper alignment, the mirror will produce an image of the lens, of the same size, and located in the plane of the pilot's eyes.

This constitutes in effect then an exit or window and if the eyes of the pilot are within this image, his field of view through this system would embrace the whole area of the mirror 50 whatever its size. The lens 56 may then be used to produce an image of the cathode ray tube at the focal plane of the mirror 50, which image would, therefore, be collimated by the parabolic mirror 50 and appear to the viewer as an object at infinity and can have whatever angular field of view the size of the mirror 50 allows.

The exit pupil formed by the system is a virtual one, but, however must meet certain requirements; i.e. it must be large enough to contain both of the pilot's eyes, plus whatever allowance for head motion may be reasonably desired. Since as shown in FIGURE 8, it is the same size as the lens, the latter must be approximately four inches in diameter.

While several embodiments of the invention have been illustrated and described, various changes in the form and relative arrangement of the parts, which will now appear to those skilled in the art may be made without departing from the scope of the invention. Reference is, therfore, to be had to the appended claims for a definition of the limits of the invention.

What is claimed is:

1. An optical display means by which a pilot may view landing conditions of an aircraft comprising in combination a cathode ray tube for supplying an image of the landing runway, a pair of binoculars, a pair of dichroic mirrors positioned before the eyes of the pilot, a pair of mirrors for reflecting the image supplied through both binoculars to the dichroic mirrors, and a collimating optical device disposed between the cathode ray tube and said binoculars and arranged to supply the image to the dichroic mirrors through both binoculars, said collimating optical device including a mosaic of lenses, a prism associated with each of said lenses so as to obtain a multiplexing of the image, whereby the pilot may view the image of the landing condition of the aircraft provided by said collimating optical device while at the same time the pilot may view through the dichroic mirrors such information of the true landing conditions as may be discerned by the pilot from the aircraft.

2. An optical display means defined by claim 1 wherein said collimating optical device provides an image size corresponding to that of the true landing conditions viewed through the dichroic mirrors by the pilot.

References Cited by the Examiner

UNITED STATES PATENTS

| | | | |
|---|---|---|---|
| 2,404,301 | 7/1946 | Land | 88—1 X |
| 2,426,184 | 8/1947 | Deloraine et al. | 324—108 |
| 2,453,697 | 11/1948 | Brown | 88—1 X |
| 2,517,779 | 8/1950 | Flint | 88—1 X |
| 2,539,405 | 1/1951 | Deloraine et al. | 343—112 |
| 2,600,662 | 6/1952 | Kurlander | 88—1 |
| 2,604,002 | 7/1952 | Wengel | 88—1 X |
| 2,780,130 | 2/1957 | Mauer | 88—1 X |
| 2,852,974 | 9/1958 | Nobles | 88—1 |
| 2,872,840 | 2/1959 | Stanton | 88—1 |
| 3,005,185 | 10/1961 | Cumming et al. | 88—1 X |
| 3,059,519 | 10/1962 | Stanton | 88—1 |

FOREIGN PATENTS

| | | |
|---|---|---|
| 862,934 | 3/1941 | France. |
| 1,103,961 | 4/1961 | Germany. |

JEWELL H. PEDERSEN, *Primary Examiner.*

CHESTER L. JUSTUS, *Examiner.*